Aug. 23, 1938.　　　　B. S. AIKMAN　　　　2,128,065
COMPRESSOR LUBRICATOR
Filed Sept. 4, 1935
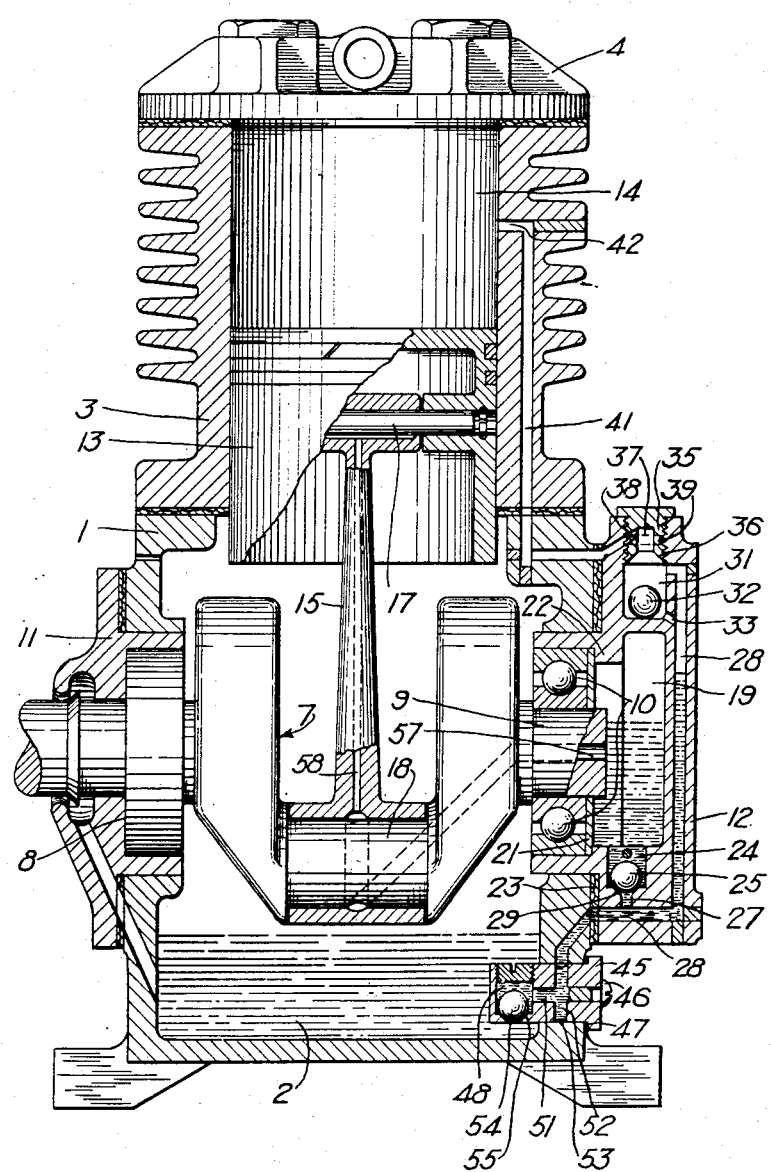
INVENTOR
BURTON S. AIKMAN
BY Wm. H. Cady
ATTORNEY Patented Aug. 23, 1938

2,128,065

UNITED STATES PATENT OFFICE 2,128,065

COMPRESSOR LUBRICATOR

Burton S. Aikman, Wilkinsburg, Pa., assignor to The Westinghouse Air Brake Company, Wilmerding, Pa., a corporation of Pennsylvania Application September 4, 1935, Serial No. 39,134

15 Claims. (Cl. 184—6)

This invention relates to fluid compressors, and more particularly to a lubrication system for a compressor.

The principal object of the invention is to provide an improved pressure lubrication system for a fluid compressor, having a simple and relatively inexpensive construction, in which the usual oil pump and oil pressure relief valve are dispensed with.

Another object of the invention is to provide means for supplying fluid lubricant at a predetermined pressure to the compressor bearings, in which means the alternating partial vacuum created in a compressor cylinder upon the inlet stroke of the piston and pressure created upon the compression stroke of said piston are utilized.

In the accompanying drawing, the single figure is an elevational view, partly in section, of a compressor embodying my invention.

Referring to the drawing, the compressor comprises a crank-case section 1 having at its base a lubricant supply or sump 2, a cylinder section 3 mounted upon the crankcase section, and a cylinder head 4, which may contain suitable inlet and exhaust valve means (not shown).

A crank shaft 7, which is adapted to be driven by any suitable means, is provided in the crankcase section 1. The crank shaft is rotatably mounted at opposite ends 8 and 9 in suitable ball bearings such as 10, said bearings having their inner races secured to the ends of said crank shaft and their outer races mounted in end plates 11 and 12 respectively, which are secured to opposite ends of the crankcase section.

A piston 13 is adapted to reciprocate in a compression chamber 14 within the cylinder section 3, and is driven from the crank shaft 7 by means of a connecting rod 15, which is pivotally connected to the usual wrist pin 17 in said piston, and is journaled on a crank pin 18 of said crank shaft.

According to my invention, the compressor is provided with a pressure lubricating system by means of which lubricant is adapted to be drawn from the sump 2 by the partial vacuum created upon an inlet stroke of the piston 13, and is then forced into a chamber or well 19 under a predetermined pressure built up on the compression stroke of said piston. The lubricant from the well is then distributed at the desired pressure to various moving parts of the compressor, the supply of said lubricant to the system being substantially constant.

As shown in the drawing, the lubricant chamber or well 19 is formed within the end plate 12 adjacent the exposed end 9 of the crank shaft 7, said chamber preferably extending above the level of the crank shaft mounting. An annular member 21 is interposed between the races of the bearings 10 and a shoulder 22 of the end plate 12 for minimizing leakage of fluid from the well 19 into the crankcase past said bearings, and a suitable gasket 23 is interposed between said end plate and the crankcase section 1 for ensuring a tight joint.

Opening into the lower end of the well 19 is a valve chamber 24 containing a check valve 25, which controls communication to said chamber from a passage 27 and a passage 28, said check valve being adapted to engage a seat 29 for preventing back flow of lubricant from the well 19 by way of said chamber.

The passage 28 leads in one direction to a valve chamber 31, which is formed in the end plate 12 above the well 19. Disposed in the valve chamber 31 is a floating check valve 32, which may be composed of any suitable material, such as cork, and is adapted normally to rest on the bottom of the valve chamber, a drainage port 33 being provided for preventing entrapment of lubricant in said chamber. A cap member 35 having screw-threaded connection with the end plate 12 is provided for closing the upper end of the valve chamber 31, and carries a valve seat 36, which is adapted to receive the floating check valve 32. A central bore 37 extends from the valve seat 36 into the cap member 35, and is connected through a radial passage 38 to an annular groove 39 countersunk in the threaded portion of said member.

A passage 41 leads from the groove 39 to a port 42 adapted to open into the compression chamber 14 in the cylinder section 3, said port, as shown in the drawing, being formed in the cylinder wall enclosing said chamber. The location of this port intermediate the opposite limits of the travel or stroke of the piston 13 is such as to permit said port to remain open while the piston 13 is moving on its compression stroke until the pressure desired for operation of the lubrication system has been built up in said chamber, the further movement of the piston then operating to close the port.

Extending into the sump 2 below the normal lubricant level is a plug member 45, which is adapted to be piloted through a suitable opening in the crankcase section 1 and clamped thereto by means of screws 46 fitted through suitable flanges on said member, a gasket 47 being provided for ensuring a tight joint. The plug member has a valve chamber 48 opening into the sump 2 and connected by way of a bore 51 and a passage 52 to the lower end of the passage 28, proper communication between said passages being ensured by a peripheral groove 53 countersunk in said plug member. Contained in the valve chamber 48 is a check valve 54 which is adapted to engage a seat 55 for preventing back flow of lubricant into the sump 2.

In operation, when the crank shaft 7 is rotated, the crank pin 18 and connecting rod 15 will reciprocate the piston 13 in the well known manner. Upon the downward stroke of the piston, a suction is created in the compression chamber 14 and, when said piston uncovers the port 42, a partial vacuum is created in the connected passage 41, bore 37, valve chamber 31, passage 28, and the passage 52, bore 51, and valve chamber 48 of the plug member. With the pressure in the valve chamber 48 thus reduced, the atmospheric pressure acting on the body of the lubricant in the sump 2 together with the pressure head of the lubricant acts against the check valve 54, unseating said valve and forcing a quantity of lubricant through the valve chamber 48, bore 51, passage 52 and into the passage 28.

As the piston 13 reaches the bottom of its suction stroke, as shown in the drawing, the suction ceases and the pressure in the cylinder chamber 14 will increase due to the supply of fluid through the usual inlet valve means (not shown), and the check valve 54 will be moved to its seat. The lubricant drawn from the sump 2, as just described, is thus trapped in the passage 28.

As the piston travels upwardly, the fluid in the compression chamber 14 is gradually compressed, and while the port 42 remains open, the pressure of fluid in passage 41 and thereby in the passage 28 is correspondingly increased. With the pressure below the check valve 25 thus increased, said valve is lifted from the seat 29, permitting an initial charging of the well 19 with fluid under pressure under the desired pressure as determined upon the closure of the port 42 by the piston.

After sufficient lubricant has been drawn from the sump 2, by continued operation of the mechanism in the manner described, so as to fill the passage 28 beyond the intersection with the passage 27, fluid pressure built up in the passage 28 upon the subsequent compression stroke of the piston 13 will act on the lubricant to lift the check valve 25 and force a quantity of lubricant past the unseated valve into the well 19. Lubricant thus supplied to the well 19 under the desired pressure is adapted to flow through a duct 57 in the crank shaft 7 to the crank pin 18, and thence through a duct 58 in the connecting rod 15 to the wrist pin 17, lubricating said bearings.

It will be seen that the pocket of fluid maintained under pressure in the well 19 exerts a substantially constant pressure on the lubricant in said well, thereby stabilizing the pressure under which lubricant is supplied to the bearings, and ensuring an approximately continuous flow through the lubricant ducts.

If operation of the compressor is continued at a speed such that lubricant is drawn from the sump 2 at a rate faster than that at which it is adapted to be forced to the bearings, the excess lubricant, upon filling the passage 28, flows into the valve chamber 31. The floating check valve 32 is then raised as the lubricant level rises, until said valve engages the seat 36. With the floating check valve 32 closed, further inlet or suction strokes of the piston 13 are ineffective to draw lubricant from the sump 2, while maintenance of the proper lubricant pressure is ensured. When continued flow of lubricant to the bearings reduces the excess supply of lubricant in the passage 28, the floating check valve 32 is lowered away from the seat 36 to its normal position, lubricant draining from the valve chamber 31 by way of the passage 33.

It will be evident that my invention provides an improved and relatively simple means for supplying lubricant at a predetermined pressure to the moving parts of a compressor, a continuous stabilized flow of the lubricant being efficiently effected by operation of the compressor in the usual manner.

While one illustrative embodiment of the invention has been described in detail, it is not my intention to limit its scope to that embodiment or otherwise than by the scope of the appended claims.

Having now described my invention, what I claim as new and desire to secure by Letters Patent, is:

1. The combination with a fluid compressor having a compression chamber, a piston operative to compress fluid in said compression chamber, and a crankcase chamber, of a lubrication system comprising a passage communicating with the compression chamber and the crankcase chamber, whereby variations in the fluid pressure in said compression chamber are communicated to said crankcase chamber, check valve means in the passage for preventing back flow of lubricant into said crankcase, and a lubricant well communicating with said passage for receiving lubricant drawn from said crankcase on the suction stroke of said piston and subjected to fluid pressure supplied from said compression chamber on the compression stroke of said piston.

2. The combination with a fluid compressor having a compression chamber, a piston operative to compress fluid in said chamber, and a lubricant supply chamber, of a lubricant well from which lubricant is supplied to lubricate the compressor, a passage between said lubricant supply chamber and said lubricant well, a check valve for preventing back flow from said lubricant well, and means operative to communicate to said passage variations in pressure created in the compression chamber by operation of the piston, whereby lubricant is supplied from said lubricant supply chamber upon the suction strokes of the piston, and is forced under pressure into said lubricant well upon the compression strokes of said piston.

3. In combination, a fluid compressor having a cylinder and a fluid compressing piston in said cylinder, a lubricant well from which lubricant is supplied to lubricate the compressor, a lubricant supply chamber, a passageway opening into said cylinder and communicating with said well and said lubricant supply chamber, and a check valve for preventing back flow from said well to said passageway, whereby upon the suction stroke of the piston lubricant is drawn into said passageway from said lubricant supply chamber and is forced past said check valve into said well upon the compression stroke of said piston.

4. In combination, a fluid compressor having a cylinder and a fluid compressing piston in said cylinder, a lubricant well from which lubricant is supplied to lubricate the compressor, a lubricant supply chamber, a passageway opening into said cylinder and communicating with said well and said lubricant supply chamber, and a check valve for preventing back flow from said well to said passageway, the compressor piston operating on its initial compression strokes to compress fluid past said check valve into said well and to draw lubricant from said lubricant supply chamber into said passageway upon the suction strokes of said piston, whereby subsequent compression strokes of the piston will force the lubricant in said passageway past said check valve into said well, where it is subject to the pressure of fluid previously supplied to said well.

5. In combination, a fluid compressor having a cylinder and a fluid compressing piston in said cylinder, a lubricant well from which lubricant is supplied to lubricate the compressor, a lubricant supply chamber, a passageway opening into said cylinder and communicating with said well and said lubricant supply chamber, and check valve means operative for preventing back flow from said well to said passageway and from said passageway to said lubricant supply chamber, whereby the partial vacuum created upon the suction stroke of the piston is utilized to draw lubricant from said lubricant supply chamber into said passageway, the compression stroke of said piston forcing lubricant and fluid under pressure from said passageway into said lubricant well.

6. In combination, a fluid compressor having a cylinder and a fluid compressing piston movable in said cylinder, means responsive to variations in the pressure in said cylinder for supplying lubricant including a passage open at one end to said cylinder, a lubricant supply chamber communicating with the other end of said passage, a check valve for preventing back flow of lubricant into said lubricant supply chamber, a lubricant well communicating with said passage intermediate its end connections, from which well lubricant is supplied to lubricate the compressor, and a check valve adapted to prevent back flow of lubricant under pressure from said well to said passage.

7. In combination, a fluid compressor having a cylinder and a fluid compressing piston movable in said cylinder, a lubricant well from which lubricant is supplied to lubricate the compressor, a lubricant supply chamber, a passageway communicating with said well and said lubricant supply chamber, check valve means for preventing back flow from said well into the passageway, and a communication leading from said passageway into the cylinder intermediate the limits of travel of said piston, which is thereby adapted upon the compression stroke to close said communication for controlling the pressure in said lubricant well.

8. In a fluid compressor having a cylinder and a fluid compressing piston in said cylinder, in combination, a lubricant supply chamber, means for lubricating the compressor including a passage communicating with the compression chamber and the lubricant supply chamber whereby fluid lubricant is drawn from said supply chamber in response to variations in the pressure in said compression chamber, and a float valve operated by fluid lubricant thus drawn from said supply chamber for closing said passage.

9. In a fluid compressor having a cylinder and a fluid compressing piston in said cylinder, in combination, a lubricant supply chamber, means for lubricating the compressor including a passage communicating with the compression chamber and the lubricant supply chamber whereby fluid lubricant is drawn from said supply chamber in response to variations in the pressure in said compression chamber, and a float valve controlled according to the level of lubricant in said passage for cutting off the connection to the cylinder.

10. In a fluid compressor having a cylinder and a fluid compressing piston in said cylinder, in combination, a lubricant supply chamber, means for lubricating the compressor including a passage communicating with the compression chamber and the lubricant supply chamber whereby fluid lubricant is drawn from said supply chamber in response to variations in the pressure in said compression chamber, and means operated by fluid lubricant thus drawn from said supply chamber for preventing the fluid lubricant from entering said cylinder.

11. In combination, a fluid compressor having a cylinder and a fluid compressing piston in said cylinder, a lubricant supply chamber, a passage communicating with said lubricant supply chamber and the cylinder and having another communication through which lubricant is supplied to lubricate the compressor, and a check valve for preventing back flow from said passageway to said lubricant supply chamber, whereby upon the suction stroke of the piston lubricant is drawn past said check valve into said passageway, and is subjected to fluid pressure upon the compression stroke of said piston.

12. In combination, a fluid compressor having a cylinder and a fluid compressing piston in said cylinder, a lubricant supply chamber, a passageway from which lubricant is supplied to lubricate the compressor, said passageway communicating with said lubricant supply chamber and with a port formed in the wall of the cylinder intermediate the limits of travel of said piston, and a check valve for preventing back flow from the passageway to the lubricant supply chamber, whereby upon the suction stroke of the piston lubricant is drawn past said check valve into said passageway, and is supplied therefrom to lubricate the compressor under a predetermined pressure upon the compression stroke of said piston.

13. In combination, a fluid compressor having a cylinder and a fluid compressing piston operative in said cylinder, a lubricant well from which lubricant is supplied to lubricate the compressor, a lubricant supply chamber, a passageway opening into the cylinder and communicating with the well and the lubricant supply chamber, means for preventing backflow from said well to said passageway, and a floating ball check valve interposed in said passageway and adapted to be floated into engagement with a seat upon the lubricant in said passageway rising to a predetermined level, thereby limiting the effect in said passage of further suction strokes of the piston, while permitting transmission of fluid pressure to said passage upon the compression strokes of said piston.

14. The combination with a fluid compressor having a compression chamber in which fluid is compressed on the compression stroke of the compressor, a piston operative to compress fluid in said chamber, and a crankcase chamber containing a supply of lubricant subject to atmospheric pressure, of lubrication means including a communication leading to said crankcase chamber, and means operative in response to variations in pressure in the compression chamber alternately to draw lubricant from said crankcase chamber into said communication and to force lubricant therefrom for lubricating the compressor.

15. In combination, a fluid compressor having a cylinder and a fluid compressing piston in said cylinder, a lubricant supply chamber, a passageway from which lubricant is supplied to lubricate the compressor, said passageway communicating with said cylinder and said lubricant supply chamber, and a check valve for preventing back flow from said passageway to said lubricant supply chamber, whereby upon the suction stroke of the piston lubricant is drawn past said check valve into said passageway from said lubricant supply chamber and is forced from said passageway to lubricate the compressor under the pressure of fluid supplied upon the compression stroke of the compressor.

BURTON S. AIKMAN.